H. D. & J. H. Felthouse,
Egg-Beater,
No 53,429.          Patented Mar. 27, 1866.
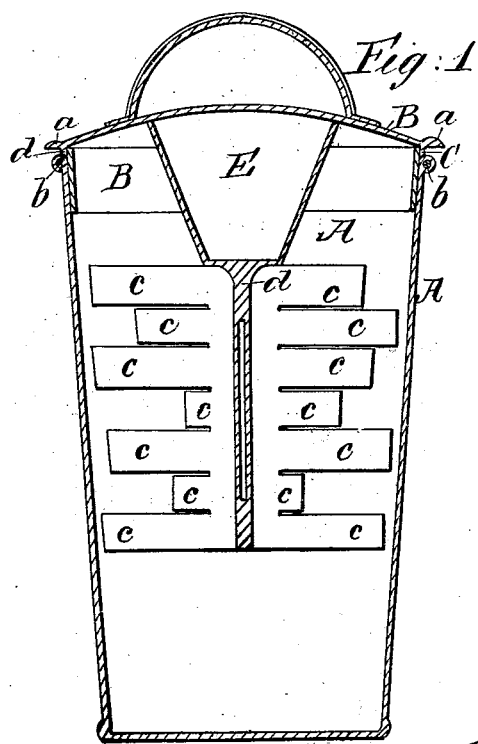
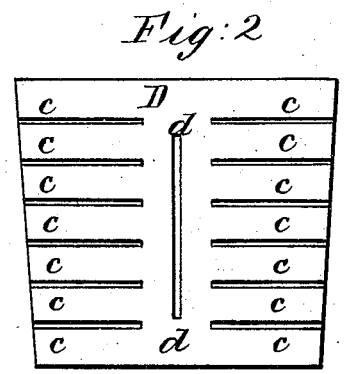
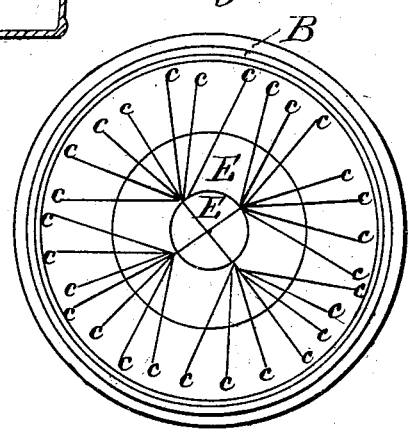
Witnesses;
D. E. Wyand
H. I. Swaney
Inventors;
Henry D. Felthouse
John H. Felthouse
By their atty.
Stephen Ustick

UNITED STATES PATENT OFFICE.

HENRY D. FELTHOUSE AND JOHN H. FELTHOUSE, OF PHILADELPHIA, PA.

IMPROVED EGG-BEATER.

Specification forming part of Letters Patent No. 53,429, dated March 27, 1866.

*To all whom it may concern:*

Be it known that we, HENRY D. FELTHOUSE and JOHN H. FELTHOUSE, of the city and county of Philadelphia and State of Pennsylvania, have invented a new and Improved Egg-Beater; and we do hereby declare that the following is a full, clear, and exact description of the construction and operation of the same, reference being had to the annexed drawings, making a part of this specification, in which—

Figure 1 is a vertical section of the beater. Fig. 2 is a face view of one of the pieces of tin, D, slitted to form the knives c. Fig. 3 is an end view of the series of knives c in connection with the lid B of the cup.

Like letters in all the figures indicate the same parts.

The nature of our invention and improvement consists in combining a series of stationary knives with a vessel for containing eggs or other articles to be shaken, substantially as follows:

In the drawings, A represents a cup for containing the eggs when shelled, or other material to be beaten. This cup we make of any desirable shape or size.

B is the lid, which is made to fit tight, to prevent the spilling of the beaten eggs, &c., by means of the gum ring C on the annular lip a, which is pressed down on the edge b of the cup A, as represented in Fig. 1, and held tight by the hand when the vessel is to be shaken in the manner we will presently describe. We form a series of knives, c, for cutting the eggs in the shaking of the cup A, out of two pieces of tin, D, one of which is represented in Fig. 2. We then solder them together at the points d d, and solder them to the conical piece E. We bend the knives, either before or after the soldering, in the manner represented in Fig. 3, in a scattering manner, so that no two shall be on the same vertical line, but do not confine ourselves to running them in any particular direction, the object being to have them all bent in such a manner as to cut the eggs or other matter as fine as possible in the shaking of the cup. The knives may all have a radial or other straight direction, or they may be curved to suit the views of the constructor.

We do not confine ourselves to the mode of forming the knives out of two pieces of tin, as described, as they may be formed and connected together in various ways to produce the same result.

The operation is as follows: The eggs being broken in the cup A, the lid B, to which the series of knives c are attached, is put in its place, as represented in Fig. 1. The operator then places two fingers under the cup A, and the thumb on the lid B, holding the latter tight in its place, and gives a rapid shaking to the cup or vessel A, which throws the broken eggs back and forth through the knives c, which cuts them up in such a manner as to completely disintegrate the particles. The beater answers for cutting up batter or anything for which egg-beaters are generally used.

The beaters, when made to be operated in the manner above described, may be of any convenient size that can be well shaken by the hand. They may be made large enough for beating up large quantities of eggs, batter, &c., by giving them a reciprocating motion by means of a crank and pitman or other suitable device. When thus made we confine the lid B in its place by means of a central bolt and nut, or otherwise, in any convenient manner.

Having thus fully described our improved egg-beater, what we claim therein as new, and desire to secure by Letters Patent, is—

Constructing a series of beaters, c, substantially as described, and confining them within a closed vessel, A, so that the eggs shall be cut up by shaking the vessel back and forth, the apparatus being constructed and operating substantially in the manner hereinbefore described, and for the purposes specified.

In testimony that the above is our invention we have hereunto affixed our hands and seals this 27th day of February, 1866.

HENRY D. FELTHOUSE. [L. S.]
JOHN H. FELTHOUSE. [L. S.]

Witnesses:
STEPHEN USTICK,
W. W. DOUGHERTY.